United States Patent
Capretta

(10) Patent No.: US 7,468,963 B2
(45) Date of Patent: Dec. 23, 2008

(54) PRIORITY SETTING SCHEME FOR A WIRELESS TERMINAL

(75) Inventor: Pietro Capretta, Brussels (BE)

(73) Assignee: STMicroelectronics Belgium N.V., Zaventem (BE)

( * ) Notice: Subject to any disclaimer, the term of this patent is extended or adjusted under 35 U.S.C. 154(b) by 179 days.

(21) Appl. No.: 11/146,904

(22) Filed: Jun. 7, 2005

(65) Prior Publication Data

US 2005/0271010 A1    Dec. 8, 2005

(30) Foreign Application Priority Data

Jun. 7, 2004    (EP)    .................... 04076673

(51) Int. Cl.
*H04Q 7/00*    (2006.01)

(52) U.S. Cl. .................... 370/329; 370/230; 370/394; 455/419; 455/420

(58) Field of Classification Search ................ 370/230, 370/310, 329, 394, 395.41, 395.42; 455/419, 455/420

See application file for complete search history.

(56) References Cited

U.S. PATENT DOCUMENTS

2001/0033557 A1 *   10/2001   Amalfitano ................ 370/335
2003/0090999 A1 *   5/2003    Janczak ...................... 370/230
2003/0125019 A1     7/2003    Bajikar
2003/3125019        7/2003    Bajikar
2003/0154112 A1 *   8/2003    Neiman et al. ................. 705/5
2004/0162106 A1 *   8/2004    Monroe et al. ........... 455/552.1

OTHER PUBLICATIONS

European Search Report from corresponding European Application No. 04076673, filed Jun. 7, 2004.
European Search Report from corresponding European Application No. 04076673, filed Jun. 7, 2004.

* cited by examiner

*Primary Examiner*—Nay Maung
*Assistant Examiner*—Tuan H Nguyen
(74) *Attorney, Agent, or Firm*—Lisa K. Jorgenson; James H. Morris; Wolf, Greenfield & Sacks, P.C.

(57) ABSTRACT

First and second wireless transceiver units operate in the same portion of the RF spectrum. An arbitration device controls when the first and second wireless transceiver units can operate. An interface connects the first transceiver unit to the arbitration device and receives requests for operation. The interface permits the transceiver unit o use one of N possible priority levels for requests. The transceiver associates a transceiver priority level to a series of packets which is chosen from a range of M possible priority levels. The transceiver unit sends a sequence of requests to operate to the arbitration device, each request in the sequence having a priority level chosen from the range of N possible priority levels. The average value of the priority levels used in the sequence depends on the associated transceiver priority level.

23 Claims, 2 Drawing Sheets

PRIORITY SETTING SCHEME FOR A WIRELESS TERMINAL

FIELD OF THE INVENTION

This invention relates to methods and devices for setting a priority level in a wireless communication apparatus as well to telecommunications systems using the methods and devices and software for use with the methods and devices.

BACKGROUND TO THE INVENTION

One band of the RF spectrum which is being increasingly used for wireless communications is the unlicensed Industrial Scientific & Medical (ISM) band at 2.4 GHz. Currently, two types of wireless technology operate in this part of the spectrum.

Firstly, there is Wireless Local Area Network (WLAN) technology which is standardized under IEEE 802.11. One variant of IEEE 802.11 uses a frequency-hopping spread spectrum (FHSS) technique with 1 MHz channel separation and pseudorandom hops across 79 channels. Another variant (IEEE 802.11b) uses direct sequence spread spectrum (DSSS) techniques, with 22 MHz channels. WLAN technology is widely used in offices, homes and public places to support networking between users.

Secondly, there is Wireless Personal Area Network (WPAN) technology, which is standardized in IEEE 802.15.1. This is a 1 Mbit/s FHSS system which uses the same 79, 1 MHz-wide channels that are used by the FHSS version of IEEE 802.11. IEEE 802.15.1 hops pseudorandomly at a nominal rate of 1600 hops/second. IEEE 802.15.1 is intended as a low power, short range (<3 m) technology for interconnecting devices such as mobile phones, portable computers and wireless handsfree headsets with fixed devices or other portable devices. One commercial implementation of IEEE 802.15.1 is known as 'Bluetooth™'.

Since both IEEE 802.11 and IEEE 802.15.1 operate in the same 2.4 GHz unlicensed frequency band, there is mutual interference between the two wireless systems which may result in severe performance degradation. The interference is of most concern with IEEE 802.11b as this uses a static channel (i.e. no frequency hopping). Factors which determine the level of interference include the separation between the WLAN and WPAN devices, the amount of data traffic flowing over each of the two wireless networks, the power levels of the various devices, and the data rate of the WLAN. Also, different types of information being sent over the wireless networks have different levels of sensitivity to the interference. For example, a voice link may be more sensitive to interference than a data link being used to transfer a data file.

The IEEE has produced a Draft Recommended Practice IEEE P802.15.2/Dec. 20, 2002; "Telecommunications and Information exchange between systems—Local and metropolitan area networks Specific Requirements—Part 15.2: Coexistence of Wireless Personal Area Networks with Other Wireless Devices Operating in Unlicensed Frequency Bands." This document outlines the interference problem and provides some guidance for how WLAN and WPAN equipment can coexist. Two categories of coexistence mechanisms are proposed: collaborative and non-collaborative. Collaborative coexistence mechanisms exchange information between two wireless networks. FIG. 1 shows an example piece of equipment 100 which includes a WPAN transceiver TX1 and a WLAN transceiver TX2. Equipment 100 can be, for example, a portable computer with the WLAN supporting a connection 40 with a WLAN base station 45 and the WPAN supporting a connection 30 with a WPAN device which, in this example, is a wireless headset 35. Some of the possible sources of interference are shown: WLAN transmissions from BS 45 may interfere with reception of WPAN traffic at TX1, or WPAN transmissions from TX1 may interfere with WLAN reception at the base station 45 (path 32 ); WPAN transmissions from head set 35 may interfere with reception of WLAN traffic at TX2, or WLAN transmissions from TX2 may interfere with WPAN reception at the head set 35 (path 42 ).

One solution proposed by the IEEE Draft Recommended Practice Document is to provide a packet traffic arbitration (PTA) control entity which communicates with both the WLAN station and WPAN station and provides per-packet authorization of all transmissions. FIG. 2 shows an apparatus 100 with an arbitration device 130. Both transceivers TX1, TX2 must request permission to transmit or receive and, in response, the arbitration device 130 will either grant or deny the permission to access the shared spectrum to transmit or receive a data packet. The recommended interface between a WPAN transceiver and an arbitration unit is shown in FIG. 2 as lines 151-154.

The Bluetooth device and the WLAN may not be placed really close to each other (maybe 10 cm distance) in this case increasing the number of the pin in the coexistence interface increase the complexity of routing them in the board and most likely it increases the board size.

The pin count of both chips will increase and this is a problem especially for the Bluetooth which is a very small chip and there is very little room for adding pins.

The WPAN can support multiple simultaneous links, which can be voice, data or control information. One of the lines between the WPAN transceiver and arbitration device 130 is a status line 152 which can be used to indicate the priority level of the link. The priority can take the value '1' or '0'. The arbitration device uses the priority level to decide whether the WPAN should be granted access to the shared RF band. Links with a priority '1' can be granted access to the band in preference to the WLAN, while the links with priority '0' are not. One problem with this arrangement is that, during a long period of WLAN activity, such as a file transfer, the WPAN links with priority '0' will be refused. The Bluetooth protocol requires transceivers to make one TX/RX operation within a predetermined timeout period to maintain synchronization. In an environment where the Bluetooth device shares the RF band with a WLAN, this can be difficult.

SUMMARY OF THE INVENTION

The present invention seeks to provide a way of improving the operation of a wireless device in a shared environment.

An advantage of the present invention is that there is no requirement to increase the number of pins of the chips used for implementation.

A first aspect of the present invention provides a method of operating a first wireless transceiver unit which operates in the same portion or has an overlapping portion of an RF spectrum as a second wireless transceiver unit, there being an arbitration device which controls when the first and second wireless transceiver units can access the shared portion of the RF spectrum and an interface connecting the first transceiver unit to the arbitration device, the interface carrying access requests, each request having one of N possible interface priority levels, the method comprising:

associating a transceiver priority level with a series of packets which are intended for transmission, the transceiver priority level being chosen from a range of M possible priority levels, where M>N; and sending a sequence of access requests to the arbitration device, each access request in the sequence having an interface priority level chosen from the range of N possible interface priority levels, wherein the average value of the interface priority levels used in the sequence depends on the associated transceiver priority level.

By associating a priority level taken from a range of M possible levels, the first transceiver unit is able to provide a greater degree of granularity to its requests. For high priority traffic, the transceiver unit can continue to send a sequence of access requests to the arbitration unit with the highest of the N possible interface priority levels. However, other traffic which is of a lower priority, but which must be sent on an occasional basis (such as periodic traffic for maintaining synchronization) can be associated with a priority level at the transceiver which will send an occasional access request at the highest one of the N interface priority levels.

In one embodiment the interface between the first transceiver unit and the arbitration device supports a high priority level and a low priority level (N=2) and the number of high priority level access requests sent during the sequence corresponds to the associated transceiver priority level.

The transceiver priority level (taken from the range of M possible levels) which is to be associated with the packets can be determined by an entity external to the first transceiver unit, such as a host of the first transceiver unit. Alternatively, the transceiver priority level (taken from the range of M possible levels) which is to be associated with the packets can be chosen by the wireless transceiver unit, based on the type of packet.

The first wireless transceiver unit can be part of a Wireless Personal Area Network (WPAN), such as one based on IEEE 802.15.1 or Bluetooth™, and the second wireless transceiver unit can be part of a Wireless Local Area Network (WLAN), such as one based on one of the IEEE 802.11 family of protocols. In such cases the first and second wireless transceiver units may be close to each other e.g. less than 1 meter from each other or less than 0.5 meter from each other. This can be typical of an application on a laptop or PC in which the two transceivers are close together. Such an application is said be a collocation of the two units.

The present invention also provides a first wireless transceiver unit which operates in the same portion or has an overlapping portion of an RF spectrum as a second wireless transceiver unit, and an arbitration device which controls when the first and second wireless transceiver units can access the shared portion of the RF. spectrum and an interface connecting the first transceiver unit to the arbitration device, the interface carrying access requests, each request having one of N possible interface priority levels, comprising:

means for associating a transceiver priority level to a series of packets which are intended for transmission, the transceiver priority level being chosen from a range of M possible priority levels, where M>N; and means for sending a sequence of access requests to the arbitration device, each access request in the sequence having an interface priority level chosen from the range of N possible interface priority levels, wherein the average value of the interface priority levels used in the sequence depends on the associated transceiver priority level.

The present invention may also provide a communications system with a first wireless transceiver unit which operates in the same portion or has an overlapping portion of an RF spectrum as a second wireless transceiver unit, there being an arbitration device which controls when the first and second wireless transceiver units as described above. The first and second wireless transceiver units may be close to each other e.g. less than 1 meter from each other or less than 0.5 meter from each other. This can be typical of an application on a laptop or PC in which the two transceivers are close together. Such an application is said be a collocation of the two units.

The functionality described here can be implemented in software, hardware or a combination of these. Accordingly, another aspect of the invention provides software for performing the method when executed on a processing engine. The software may be installed on the transceiver unit at the time of manufacture, or it may be installed onto an existing transceiver unit at a later date as an upgrade. The software may be stored on an electronic memory device, hard disk, optical disk or other machine-readable storage medium. The software may be delivered as a computer program product on a machine-readable carrier or it may be downloaded directly to the transceiver unit via a network connection.

BRIEF DESCRIPTION OF THE DRAWINGS

Embodiments of the invention will be described with reference to the accompanying drawings in which.

DESCRIPTION OF PREFERRED EMBODIMENTS

The present invention will now be described with reference to certain embodiments and with reference to the above mentioned drawings. Such description is by way of example only and the invention is not limited thereto. In particular the present invention will be described with reference to radio communications network but the present invention is not limited thereto. The term "wireless" should be interpreted widely to cover any communications system which does not use fixed wireline communications for some of its transmissions. Alternative wireless communications systems include optical systems such as those operating with diffuse infra-red. It should also be noted that the term "wireless" also includes so-called cordless systems. General aspects of cordless communications systems are described for instance in the book by W. Tuttlebee, "Cordless Telecommunications Worldwide", Springer, 1997. Cordless systems are generally local, uncoordinated radio communications networks having a limited range.

Figure 1:
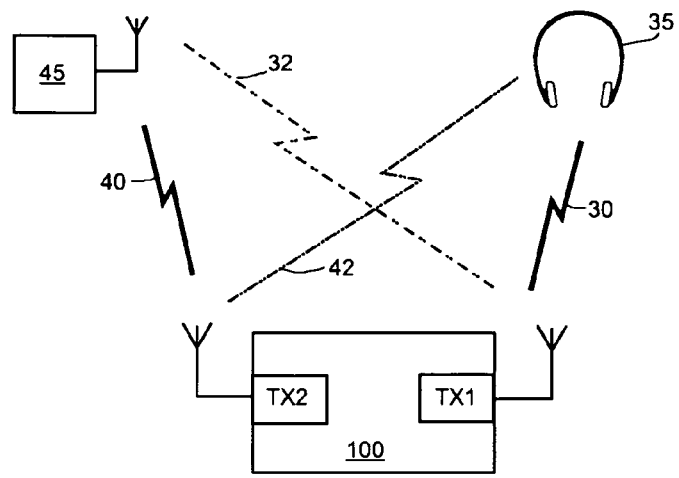
FIG. 1 shows an apparatus with two co-located wireless transceivers operating in a common RF band.
Figure 2:
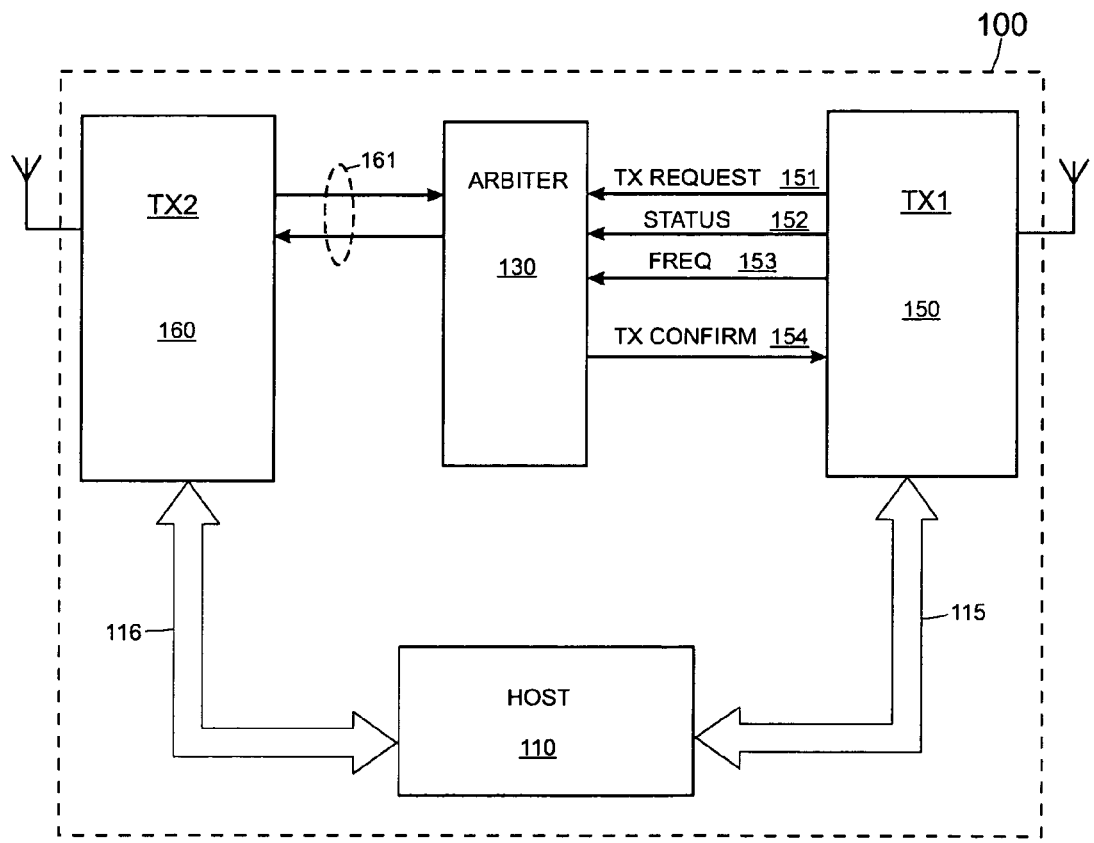
FIG. 2 shows the apparatus of FIG. 1 with an arbitration unit for coordinating access to the common RF band.

Referring again to FIG. 2, this shows an apparatus in which a transceiver TX1 of a first wireless system, e.g. a WPAN, such as a WPAN based on a IEEE 802.15.1 protocol, e.g. Bluetooth, and a transceiver TX2 of a second wireless system, e.g. a WLAN, such as a WLAN based on IEEE 802.11b are co-located with one another at an apparatus 100. An arbitration device 130 communicates with TX1 via an interface 151-154 and with TX2 via an interface 161. The interface between the WPAN transceiver TX1 and the arbiter 130 comprises four lines 151-154. TX1 uses line 151 (TX Request) to send a request to access the shared RF band. The priority of the request is indicated by setting line 152 (Status) high (high priority) or low (low priority) at a similar time to making the request. The Frequency line 153 (FREQ) is an optional line, and can be used to indicate that TX1 intends to 'hop' into one of the restricted (shared) channels during the next transmission/reception slot. The arbiter may or may not decide to let the Bluetooth transmit/receive even in shared channels. This is dependent on the implementation of the arbiter which is vendor dependent. The present invention is not dependent upon any particular arbiter implementation.

The arbiter 130 uses line 154 (TX CONFIRM) to indicate whether TX1 is allowed to operate in the next slot. If TX1 is not allowed to operate, it must not transmit during the next slot.

In a similar manner to TX1, TX2 of the WLAN uses an interface 161 to indicate when it wishes to access the shared RF band and receives a signal indicating permission or denial to transmit from the arbiter 130.

Each attempt to transmit by either TX1 or TX2 is submitted to the arbiter 130 for approval. The arbiter 130 may deny a transmit request that would result in a collision. The arbiter 130 provides a permission/denial signal to both TX1 and TX2 on a per packet/slot basis. When a collision would occur, the arbiter 130 prioritizes transmissions of TX1 and TX2 based on the priorities of the transmissions that it receives on line 152 and interface 161.

Figure 3:
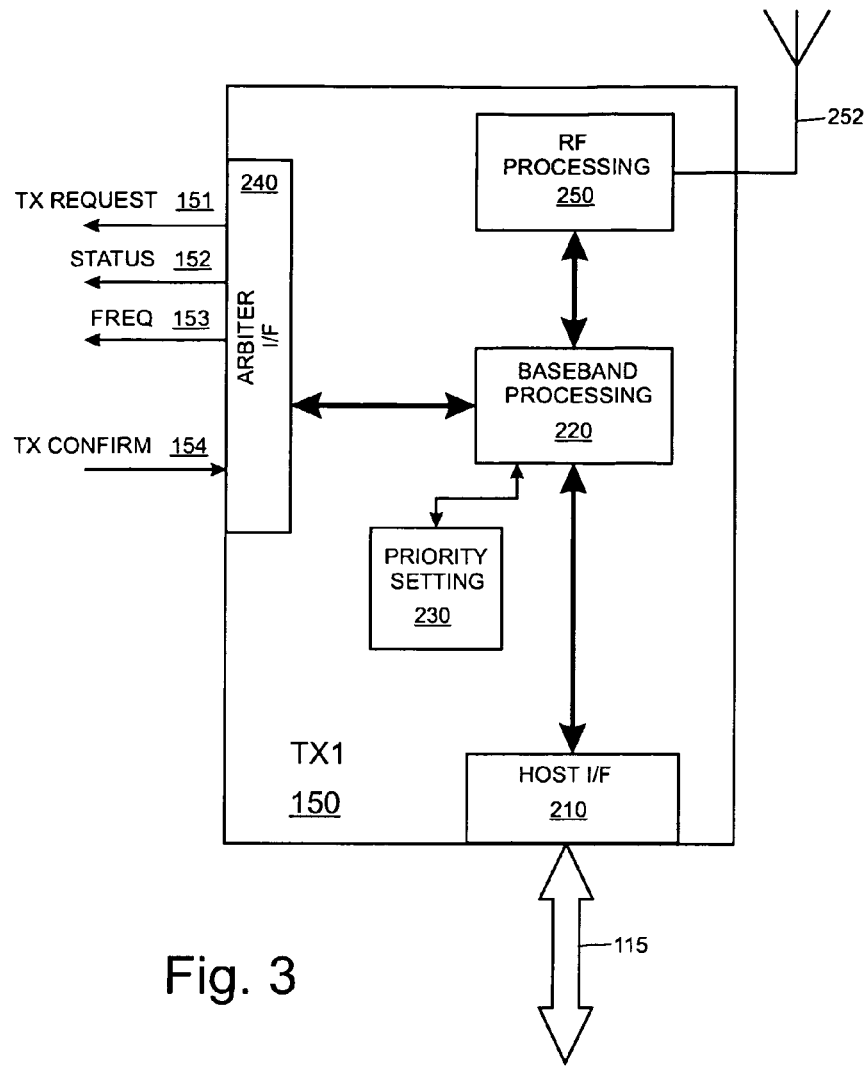
FIG. 3 shows one of the transceivers in more detail in accordance with an embodiment of the present invention.

FIG. 3 shows transceiver TX1 in more detail. An interface 210 communicates 115 with a host 110. The host can provide the data which is to be transmitted by the transceiver TX1, such as voice data or data for a file transfer. A baseband processing unit 220 packetizes the data, if necessary, and issues transmission requests which are sent to the arbiter interface unit 240 for transmission along lines 151-153. A permission/denial signal is received from interface unit 240. An RF processing unit 250 modulates to RF for transmission via antenna 252. As noted above, TX1 can support multiple (e.g. 7) simultaneous connections, called links. As an example, one link may carry voice data between unit 100 and handsfree headset 35, while another link may carry data between unit 100 and another portable device. Bluetooth defines a number of different types of link, including Synchronous Connection-oriented (SCO) links which carry constant bite rate data, such as voice data, and Asynchronous Connection-oriented (ACL) links which carry data or control data (ACL-C). SCO links generate a series of packets at regular time intervals whereas ACL links generate packets at irregular time intervals.

A priority setting unit 230 is used to set the priority of the traffic on each link. Fore every link, a priority is associated with that link which is taken from a possible range of 8 priority levels. The levels range from priority level 7 (maximum priority) to priority level 0 ( minimum priority). The priority level can be assigned, within transceiver TX1, using a table in priority setting unit 230. The priority level can be set based on the type of traffic, e.g. voice-priority 7; file transfer data-priority 3; parked connections sync data-priority 1. Alternatively, the priority can be set by the host and is received, via link 115, from the host 110.

As described above, line 152 (STATUS) between transceiver TX1 and arbiter 130 has only one line (STATUS) which can be used to indicate the priority, and the priority can take one of two values: high (1) or low (0). A priority level in the range 0 . . . 7is achieved by the following the following table of priority levels to a sequence of requests:

| Priority | Sequence |
|----------|----------|
| 7 | 1111111 |
| 6 | 0111111 |
| 5 | 1011101 |
| 4 | 1010101 |
| 3 | 0101010 |
| 2 | 0100010 |
| 1 | 0000001 |
| 0 | 0000000 |

Figure 4:
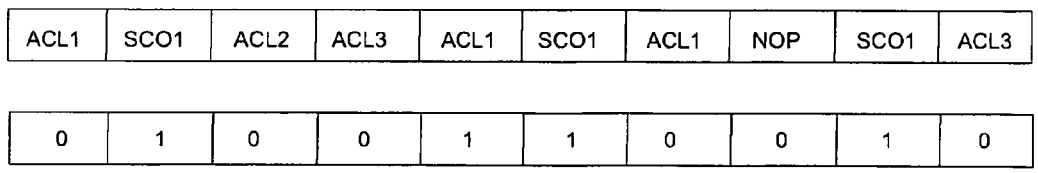
FIG. 4 shows a sequence of requests for packet transmission as used in embodiments of the present invention.

In the table it is preferred to distribute the zeros and the ones uniformly. To explain this table, consider that the transceiver TX1 supports a link (ACL 1 ) which is given the priority level 3. The link has a stream of packets associated with it which carry the data for that link. For every packet, the transceiver TX1 makes a transmission request just before the time it is scheduled to transmit that packet. For the first packet, the transceiver TX1 makes a request with priority '0'. For the second packet, the transceiver TX1 makes a request with priority '1'. After seven packets, the transceiver TX1 has made a total of 3 requests with priority '1' and 4 with priority '0'. FIG. 4 shows a sequence of access requests and their priority levels, together with the packets for other links ACL2, ACL3 and SCO1. A priority level of 7—the maximum priority level—is translated into a sequence of requests which all have the priority level equal to 1 (full protection). A priority level of 0—the lowest priority level—is translated into a sequence of requests with the priority level of 0. A priority level of 4—medium—is translated into a sequence of requests in which 4 out of 7 requests have the priority level of 1 and 3 requests have the priority level of 0. In general, a priority level m (out of a total range of M priority levels) is translated into m requests having a value of 1 in each sequence of M requests.

PWAN links which are not currently carrying data, but which need to be periodically used to maintain synchronization, can be allocated a priority level of 1 (in the range 0 . . . 7) to ensure that at least one out of every eight requests is granted.

This mechanism is completely transparent at the level of the algorithm used by arbiter 130 since, for each transaction, the arbiter 130 sees only a request of priority level 1 or a priority level 0.

If there is priority 0 and the arbiter lets the Bluetooth transmitter operate (because for instance the WLAN is not doing anything) then the Bluetooth transmitter will make the transmit/receive (TX/RX). If the arbiter denies the operation, the Bluetooth transmitter will not do the TX/RX and it will try to do it in the next available slot (always requiring permission before doing so).

In this embodiment, the status line 152 signals one of two priority levels. The invention can be applied to apparatus in which the interface can support more than two priority levels (e.g. N priority levels), with transceiver TX1 having M priority levels (where N<M). In this case, each of the M transceiver priority levels is associated with a sequence of requests which are spread across the range of N levels. As the transceiver priority level increases, the average value of interface priority levels in the sequence increases. In the following example, the transceiver has seven priority levels, the interface to the arbiter 130 has 4 priority levels (0, 1, 2, 3) and the sequence lasts for only two periods. It can be seen that the average value of the priority levels used in the sequence varies according to the transceiver priority level.

| Priority | Sequence |
| --- | --- |
| 6 | 33 |
| 5 | 32 |
| 4 | 31 |
| 3 | 12 |
| 2 | 11 |
| 1 | 01 |
| 0 | 00 |

In the above described embodiment, transceivers TX1, TX2 are co-located within the same physical unit as the arbiter 130. For instance, the two transceivers TX1, TX2 may be located less than 1 meter apart or for example less than 0.5 meter apart. This may occur if both units are in a PC or a laptop. Where one or more of the TX1, TX2 and arbiter 130 are not housed within the same physical unit, an appropriate connection between the units carries the access requests and replies.

With reference to all the embodiments of the present invention the problem of having a priority mechanism based on one single line which may give only priority 0 or priority 1 to each packet can be solved. For example, conventionally the number of lines carrying the priority indication cannot be increased practically because two chips (for two different telecommunications protocols) may be placed far away from each other on the device. Having more lines for priority would increase the complexity of the routing in the device and increase its size. Hence, one priority line is an important practical restriction. Other mechanisms like shared memory, etc. suffer from the same type of problem. A solution to this problem proposed by the present invention is to use at least a single priority line to provide a generic level of priority to each connection link. A telecommunications device using a first protocol, e.g. a wireless protocol such as Bluetooth device, can have different links to the same device or to a different device at the same time. In case of coexistence with a device using a second, different, telecommunications protocol, e.g. a wireless protocol such as WLAN, it is preferred to assign different priority levels to each first protocol link, e.g. Bluetooth link, to avoid loss of performance in the system. For example: the first protocol device, e.g. Bluetooth device, may have one voice link to one device and one data link to another device. Without a mechanism in accordance with the present invention, the following might be used:

i) set priority 1 to all voice packets and set priority 0 to all datapackets. In case the WLAN chip would be active this would result in a very good quality for the Bluetooth voice link and basically no throughput on the Bluetooth data link. This is clearly not acceptable.

ii) set priority 1 for all voice packet and priority 1 on all datapackets. This would result in very good Bluetooth links but basically no throughput on a WLAN link which would be not acceptable.

One aspect of the present invention is a mechanism to allow a variable priority of the different first protocol, e.g. Bluetooth, links. An example can be setting a priority between 0% and 100%, with a certain granularity. The coexistence of links with different protocols will then have a higher performance.

The invention is not limited to the embodiments described herein, which may be modified or varied without departing from the scope of the invention.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not intended as limiting. The invention is limited only as defined in the following claims and the equivalents thereto.

What is claimed is:

1. A method of operating a first wireless transceiver unit which operates in a shared portion of an RF spectrum, with a second wireless transceiver unit operating in the shared portion of the RF spectrum, an arbitration device controlling when the first and second wireless transceiver units can access the shared portion of the RF spectrum and an interface connecting the first transceiver unit to the arbitration device, wherein the first transceiver supports a plurality of connection links, the interface supports a first plurality of interface priority levels and carries a plurality of access requests from the first transceiver to the arbitration device, and each access request is associated with an interface priority level from the first plurality of the interface priority levels, the method comprising:

associating a connection link from the plurality of connection links with a transceiver priority level from a second plurality of transceiver priority levels;

associating the transceiver priority level of the connection link with a sequence of access requests from the plurality of access requests carried by the interface, wherein the transceiver priority level positively correlates with an average value of interface priority levels of the access requests forming the sequence; and communicating the transceiver priority level of the connection link to the arbitration device sending the sequence of the access requests to the arbitration device.

2. A method according to claim 1 wherein the first plurality of the interface priority levels comprises a high priority level and a low priority level and a number of high priority level requests sent during the sequence corresponds to the associated transceiver priority level.

3. A method according to claim 2 wherein the sequence is a sequence of access requests each taking a value of 0 or 1, and wherein the number of the access requests taking a value of 0 or 1 is equal to a number of the transceiver priority levels of the second plurality of transceiver priority levels minus one.

4. A method according to claim 1 further comprising receiving a transceiver priority level which is to be associated with the series of access requests.

5. A method according to claim 4 wherein the transceiver priority level is chosen by a host of the first wireless transceiver unit.

6. A method according to claim 1 wherein the transceiver priority level is chosen by the first wireless transceiver unit, based on a type of packets intended for transmission.

7. A method according to claim 1 wherein the first and second wireless transceiver units are co-located.

8. A method according to claim 1 wherein the first wireless transceiver unit supports a Wireless Personal Area Network (WPAN) protocol.

9. A method according to claim 8 wherein the WPAN protocol is based on IEEE 802.15.1 or Bluetooth™.

10. A method according to claim 1 wherein the second wireless transceiver unit supports a Wireless Local Area Network (WLAN) protocol.

11. A method according to claim 10 wherein the WLAN protocol is IEEE 802.11.

12. A computer-readable medium encoded with a computer program comprising computer-executable instructions for use with a processor of a first wireless transceiver unit which operates in a shared portion of an RE spectrum, with a second wireless transceiver unit operating in the shared portion of the RE spectrum, an arbitration device controlling when the first and second wireless transceiver units can access the shared portion of the RF spectrum and an interface connecting the first transceiver unit to the arbitration device, wherein the first transceiver supports a plurality of connection links, the interface supports a first plurality of interface priority levels and carries a plurality of access requests from the first transceiver to the arbitration device, and each access request is associated with an interface priority level from the first plurality of the interface priority levels, the computer program comprising:

means for associating a connection link from the plurality of connection links with a transceiver priority level from a second plurality of transceiver priority levels;

means for associating the transceiver priority level of the connection link with a sequence of access requests from the plurality of access requests carried by the interface, wherein the transceiver priority level positively correlates with an average value of interface priority levels of the access requests forming the sequence; and means for communicating the transceiver priority level of the connection link to the arbitration device by sending the sequence of the access requests to the arbitration device.

13. A control apparatus for a first wireless transceiver unit which operates in a shared portion of an RF spectrum, with a second wireless transceiver unit operating in the shared portion of the RF spectrum, an arbitration device controlling when the first and second wireless transceiver units can access the shared portion of the RF spectrum and an interface connecting the first transceiver unit to the arbitration device, wherein the first transceiver supports a plurality of connection links, the interface supports a first plurality of interface priority levels and carries a plurality of access requests from the first transceiver to the arbitration device, and each access request is associated with an interface priority level from the first plurality of the interface priority levels, the control apparatus being arranged to:

associate a connection link from the plurality of connection links with a transceiver priority level from a second plurality of transceiver priority levels;

associating the transceiver priority level of the connection link with a sequence of access requests from the plurality of access requests carried by the interface, wherein the transceiver priority level positively correlates with an average value of interface priority levels of the access requests forming the sequence; and communicate the transceiver priority level of the connection link to the arbitration device by sending the sequence of the access requests to the arbitration device.

14. A control apparatus according to claim 13 further comprising means for supporting a high priority level and a low priority level and for sending a number of high priority level requests during the sequence corresponding to the associated transceiver priority level.

15. A control apparatus according to claim 14, wherein the sequence is a sequence of access requests each taking a value of 0 or 1, and wherein the number of the access requests taking a value of 0 or 1 is equal to a number of the transceiver priority levels of the second plurality of transceiver priority levels minus one.

16. A control apparatus according to claim 13, further comprising means for receiving the transceiver priority level which is to be associated with the series of access requests.

17. A control apparatus according to claim 13, wherein the transceiver priority level is chosen by a host of the first wireless transceiver unit.

18. A control apparatus according to claim 13, further comprising means of the first wireless transceiver unit for choosing the transceiver priority level based on a type of packets intended for transmission.

19. A first wireless transceiver unit incorporating a control apparatus, with the first wireless transceiver unit operating in a shared portion of an RE spectrum, a second wireless transceiver unit operating in the shared portion of the RE spectrum, an arbitration device controlling when the first and second wireless transceiver units can access the shared portion of the RE spectrum and an interface connecting the first transceiver unit to the arbitration device, wherein the first transceiver supports a plurality of connection links, the interface supports a first plurality of interface priority levels and carries a plurality of access requests from the first transceiver to the arbitration device, and each access request is associated with an interface priority level from the first plurality of the interface priority levels, the control apparatus being arranged to:

associate a connection link from the plurality of connection links with a transceiver priority level from a second plurality of transceiver priority levels;

associating the transceiver priority level of the connection link with a sequence of access requests from the plurality of access requests carried by the interface, wherein the transceiver priority level positively correlates with an average value of interface priority levels of the access requests forming the sequence; and communicate the transceiver priority level of the connection link to the arbitration device by sending the sequence of the access requests to the arbitration device.

20. A first wireless transceiver unit according to claim 19 which is co-located with the second wireless transceiver unit which operates in the same RF band or overlaps therewith.

21. A first wireless transceiver unit according to claim 18 which supports a Wireless Personal Area Network (WPAN) protocol.

22. A first wireless transceiver unit according to claim 18 wherein the WPAN protocol is IEEE 802.15.1 or Bluetooth™.

23. An arrangement of a first wireless transceiver unit which operates in a shared portion of an RF spectrum, with a second wireless transceiver unit operating in the shared portion of the RE spectrum, an arbitration device controlling when the first and second wireless transceiver units can access the shared portion of the RE spectrum and an interface connecting the first transceiver unit to the arbitration device, wherein the first transceiver supports a plurality of connection links, the interface supports a first plurality of interface priority levels and carries a plurality of access requests from the first transceiver to the arbitration device, and each access request is associated with an interface priority level from the first plurality of the interface priority levels, comprising:

means for associating a connection link from the plurality of connection links with a transceiver priority level from a second plurality of transceiver priority levels;

means for associating the transceiver priority level of the connection link with a sequence of access requests from the plurality of access requests carried by the interface, wherein the transceiver priority level positively correlates with an average value of interface priority levels of the access requests forming the sequence; and means for communicating the transceiver priority level of the connection link to the arbitration device by sending the sequence of the access requests to the arbitration device.

\* \* \* \* \*

UNITED STATES PATENT AND TRADEMARK OFFICE
CERTIFICATE OF CORRECTION

PATENT NO. : 7,468,963 B2  Page 1 of 1
APPLICATION NO. : 11/146904
DATED : December 23, 2008
INVENTOR(S) : Pietro Capretta It is certified that error appears in the above-identified patent and that said Letters Patent is hereby corrected as shown below:

Col. 5, line 45, should read:
constant bit rate data, such as voice data, and Asynchronous line 51, should read:
traffic on each link. For every link, a priority is associated line 66, should read:
the range 0 . . . 7 is achieved by applying the following table Claim 12, col. 8, lines 65-67, should read:
which operates in a shared portion of an RF spectrum, with a second wireless transceiver unit operating in the shared portion of the RF spectrum, an arbitration device controlling Claim 19, col. 10, lines 3-11 should read:
a shared portion of an RF spectrum, a second wireless transceiver unit operating in the shared portion of the RF spectrum, an arbitration device controlling when the first and second wireless transceiver units can access the shared portion of the RF spectrum and an interface connecting the first transceiver Claim 23, col. 10, lines 43-45, should read:
tion of the RF spectrum, an arbitration device controlling when the first and second wireless transceiver units can access the shared portion of the RF spectrum and an interface Signed and Sealed this Seventh Day of April, 2009

JOHN DOLL
*Acting Director of the United States Patent and Trademark Office*